(12) United States Patent
Verma et al.

(10) Patent No.: US 8,832,231 B1
(45) Date of Patent: Sep. 9, 2014

(54) PROVIDING UNIFORM WEB CONTENT ACROSS AFFILIATED WEB SITES

(75) Inventors: Vikrant Narendra Verma, Alpharetta, GA (US); Anup Mathew Thomas, Johns Creek, GA (US); Srinivas Kasaraneni, Cumming, GA (US)

(73) Assignee: Cellco Partnership, Basking Ridge, NJ (US)

( * ) Notice: Subject to any disclaimer, the term of this patent is extended or adjusted under 35 U.S.C. 154(b) by 701 days.

(21) Appl. No.: 13/050,778

(22) Filed: Mar. 17, 2011

(51) Int. Cl.
*G06F 15/16* (2006.01)
*H04L 29/06* (2006.01)

(52) U.S. Cl.
CPC ............................ *H04L 63/0815* (2013.01)
USPC ...................... 709/219; 709/217; 709/218

(58) Field of Classification Search
CPC .................... H04L 63/0815; G06F 21/41
USPC .................................................. 709/217–219
See application file for complete search history.

(56) References Cited

U.S. PATENT DOCUMENTS

| 7,912,762 | B2 * | 3/2011 | Sirota | 705/26.5 |
| 2004/0088355 | A1 * | 5/2004 | Hagan et al. | 709/203 |
| 2007/0233540 | A1 * | 10/2007 | Sirota | 705/8 |
| 2011/0112903 | A1 * | 5/2011 | Goldman et al. | 705/14.53 |

* cited by examiner

*Primary Examiner* — Mohamed Wasel

(57) ABSTRACT

Uniform web content may be provided across affiliated web sites of an organization and associated parties in a centralized, personalized, consistent, dynamic, fast-rendering manner that may be easy to maintain and easily inserted into any of the affiliated web sites. The affiliated web sites may each include code to refer to rendering logic residing on a centralized web tier for the uniform web content to be sent with unique web content to terminal devices of users. The uniform web content may load in advance of unique web content of the particular affiliated web site when displaying a corresponding web page to a user. The uniform web content may be generated on the client side and integrated with unique web content, providing for a consistent look and feel through the affiliated web sites.

22 Claims, 3 Drawing Sheets

PROVIDING UNIFORM WEB CONTENT ACROSS AFFILIATED WEB SITES

TECHNICAL FIELD

The present subject matter relates to methods and systems for providing uniform web content across affiliated web sites.

BACKGROUND

The convenience of performing many daily functions online has boosted the number of people using the Internet. Today, Internet communication enables E-commerce, social networking, entertainment, etc. The self-service functionality provided by the Internet has not only benefited customers but also enterprises in cutting down expenses required for running operations requiring employment of various customer-service personnel. As a result, many large-scale enterprises run a number of web sites on different web address domains, for example, for different purposes or for different divisions. Some enterprises also coordinate online activities with other companies for various commercial reasons.

In such a situation, it is often desirable to coordinate information technology systems of various divisions of the enterprise for the various enterprise web sites and/or with those of enterprise customers, suppliers and partners who maintain otherwise affiliated web sites. For example, it may be desirable for users/customers of the enterprise to be able to use a single login procedure, with a common username and password, across all of the affiliated web sites. It may also be desirable to provide some common content to provide a common look and feel. It may also be desirable to provide user some navigation capabilities in any or all of the web sites in the affiliated network of sites.

When a company or organization desires to change content common among affiliated web sites, however, coordination with each of the affiliated web sites can be cumbersome, time consuming, and costly. When using server-side or backend integration to achieve personalized, dynamic, and uniform web content, multiple different versions of server-side integration may be required to accommodate the various software and hardware platforms. For example, Microsoft .NET based web sites may use a different integration method as compared to Java Platform, Enterprise Edition (Java EE) or Hypertext Preprocessor (PHP) based web sites. With such variation, companies may be required to coordinate with the affiliated web sites and core information technology (IT) teams to ensure a consistent presentation is attained with each of the affiliated web sites.

For a seamless user experience, care must be taken to ensure that all affiliated web sites make the change or go live with the same version at the same time, which can be difficult. Further, a page may not be available for display to the user until after integration calls have been made, and display of dynamic menus based on a user profile across various domains may require complex integration efforts with individual affiliated web sites.

Hence, a need exists for improved methods and systems to provide a framework to present a consistent user experience across multiple web sites and domains.

SUMMARY

The teachings herein alleviate one or more of the above-noted problems with providing web content that is uniform among affiliated web sites.

A system for providing a framework to present a consistent user experience across multiple web sites may include (client-side) rendering logic to provide the uniform web content across affiliated web sites. The rendering logic may be communicated to and executed on a terminal device of a user of any of the affiliated web sites. The uniform web content may provide interactive user navigation of pages from the affiliated web sites to content or services common among the affiliated web sites. The uniform web content may include user-specific content, with the framework for presenting a consistent user experience including a centralized service tier for providing the user-specific content. This framework may include a centralized web tier and rendering logic that may be communicated to and executed on a terminal device (user agent or web browser) of a user of any of the affiliated web sites. The centralized web tier may include rendering logic, styling information, navigational elements, and branding information for providing the uniform web content across the affiliated web sites. Each of the terminal devices (user agents or web browsers) may use the rendering logic to combine or integrate the uniform web content with unique web content that may be unique among a number of affiliated web sites and may be communicated from the individual web site.

Methods for providing a framework to present a consistent user experience across multiple web sites may include storing rendering logic on a centralized server. The rendering logic may be communicated to and executed on terminal devices (user agents or web browsers) of users of affiliated web sites, which may run on separate servers. The framework for providing a consistent user interface may include a centralized web tier, which may include rendering logic, style information, and branding information for providing uniform content across the affiliated web sites. A web server may receive a request from a terminal device of a user to view a page. In turn, based on the inclusion of the rendering logic references within the web page, the terminal device may then directly request the corresponding files from the centralized server while the requested page is being rendered, in order to display the uniform web content dynamically within the web page. The terminal device may run the rendering logic to generate the uniform web content. The terminal device may further display a page having integrated uniform web content and unique web content.

As a result, uniform dynamic web content, e.g., a global navigation menu bar, may be provided across affiliated web sites of an organization in a centralized, personalized, consistent, dynamic, fast-rendering manner that may be easy to maintain and easily inserted into any of the affiliated web sites.

Additional advantages and novel features will be set forth in part in the description that follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

Generally, according to the present disclosure, uniform web content, e.g., a global navigation menu bar, may be provided across affiliated web sites of an organization in a centralized, personalized, consistent, dynamic, fast-rendering manner that may be easy to maintain and easily inserted into any of the affiliated web sites. Such affiliated web sites may include various lines of business, domains, and application service providers (ASPs). The affiliated web sites may each include a set of standardized code references to rendering logic that reside on a centralized web tier for the purpose of displaying the uniform web content. The uniform web content may load on the terminal devices in advance of the unique web content of the particular affiliated web site when displaying a corresponding web page to a user. Thus, uniform web content may be generated on the client side and integrated with unique web content, instead of being generated on the backside. Such configuration may allow changes to the uniform web content to be made easily, without the need for modifications to each affiliated web site, while providing for a consistent look and feel through many affiliated web sites.

Figure 1:
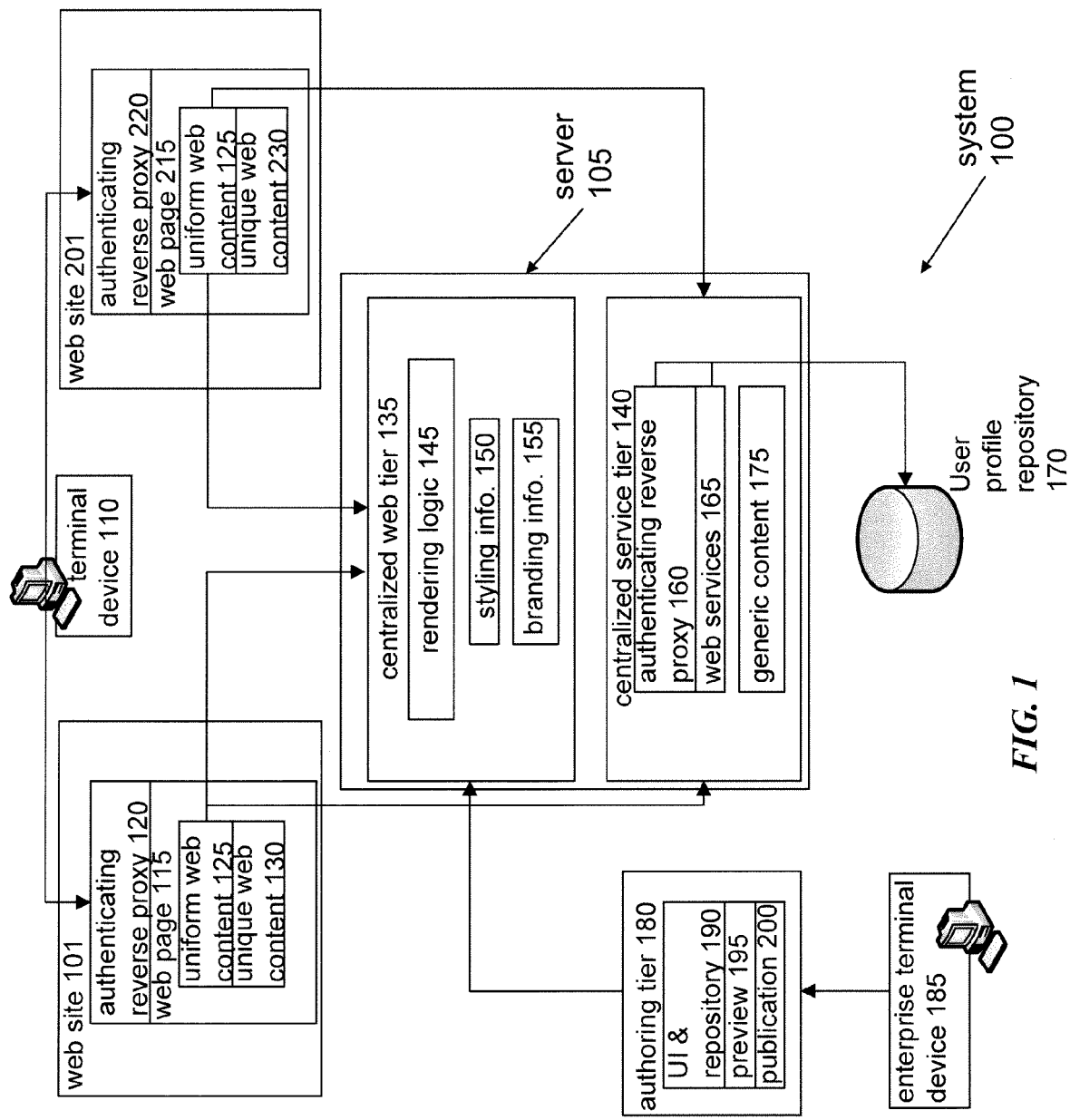
FIG. 1 illustrates a system providing a framework to present a consistent user experience across multiple web sites, in accordance with certain aspects of the present disclosure.

Reference now is made in detail to the examples illustrated in the accompanying drawings and discussed below. FIG. 1 illustrates a system 100 providing a framework to present a consistent user experience across multiple web sites, in accordance with certain aspects of the present disclosure. The system 100 may include rendering logic 145 stored on a centralized server 105, and web servers having unique web content and code referring to uniform web content, such as affiliated web sites 101, 201.

A customer or other user, through a terminal device 110 connected to a browser, may request a web page 115 of one of the web sites 101. The web server associated with the web site 101 may optionally include an authenticating reverse proxy 120 for secure content. The authenticating reverse proxy 120 may verify identity and authorization via user identification, password, or otherwise, before providing the web page 115 or other content to the user. Once authentication is complete, or if the authenticating reverse proxy 120 is not present, the web page 115 may be provided to the terminal device 110. The web page 115 may display uniform web content 125 and unique web content 130. The uniform web content 125 may be any content shared among a number of affiliate web sites. For example, the uniform web content 125 may include a global navigation menu bar. The unique web content 130 may be any content specific to the particular affiliate web site. For example, the unique web content 130 may include applications or features particular to the web page 115 that may not be replicated in the affiliate web sites. The uniform web content 125 may be loaded before the unique web content 130.

The web site 101 and/or web page 115 may include code to instruct the terminal device 110 to refer to the centralized server 105 for rendering logic 145 to execute in generating the uniform web content 125. More particularly, the web page 115 may include code referencing rendering logic 145 of a centralized web tier 135 and/or a centralized service tier 140 stored on the centralized server 105. The web site 101 may be configured to use the rendering logic 145 to integrate the uniform web content 125 with the unique web content 130 to provide a congruent look and feel. The rendering logic 145 may be communicated to and executed directly on the terminal device 110 of the user to generate the uniform web content 125 on the web page 115, or other portions of the web site 101. The rendering logic 145 may be configured to generate the uniform web content 125 for display on the web page 115, along with the unique web content 130 provided by the web site 101. Thus, the uniform web content 125 may be provided as client-side technology. The use of client-side technology, along with loading and display of the uniform web content 125 before loading of the unique web content 130 may provide the user with the experience of looking at information much more quickly than similar information provided by the backend side, where a backend integration response may be required before loading the web page 115. In some instances, the uniform web content 125, e.g., the global navigation menu bar, may appear almost instantaneously.

The rendering logic 145 may be agnostic of the technology used by the web site 101. Stated otherwise, the rendering logic may be independent of the platform used, minimizing difficulties that may otherwise be associated with variations in backend systems. The rendering logic 145 may be stored on the centralized server 105 and may include the centralized web tier 135 and/or the centralized service tier 140 for providing the uniform web content 125 to the terminal device 110. The centralized web tier 135 may include rendering logic 145, styling information 150, branding information 155, navigational elements (not shown), or any other information allowing for the uniform web content 125 to have a standardized look and feel and to contain common content or services in a manner that is global with respect to multiple affiliated web sites. The rendering logic 145 may be in the form of a JavaScript file or set of JavaScript files, the styling information 150 may be in the form of a cascading style sheet (CSS) file or a set of CSS files, and the branding information 155 may be in the form an image file or a set of image files. The centralized service tier 140 may include an authenticating reverse proxy 160, and web services 165, which may refer to a user profile repository 170 to provide authentication and additional uniform web content 125 in the form of user-specific content. Such details may include security information, type of account, features on the account, account information, and/or user set preferences. Thus, the uniform web content 125 for a particular user may include information tailored to that user. For example, if the uniform web content 125 includes a menu bar, the user-specific content may include a menu item relating to that user's account, as provided by the centralized service tier 140.

The authenticating reverse proxy 160 may include single sign on (SSO), cross-domain single sign on (CDSSO), and authentication. Web services 165 may include representational state transfer (REST) style, JavaScript object notation (JSON) or "cookie reflection." Cookie reflection is a process by where cookies between domains can be synchronized using a combination of client-side rendering logic and server-side components. Alternatively, if secure content is not requested, generic content 175 may be provided. Such generic content 175 may not be role-based, but may still be dynamic content, such as REST-style and/or JSON based. The details about the user's profile or other information from the centralized service tier 140 may be used to provide and customize the uniform web content 125 based on the dynamic asynchronous query using Document Object Model (DOM) manipulation, Asynchronous JavaScript and Extensible Markup Language (AJAX) as is appropriate. Thus, the uniform web content 125 may be customized to include user-specific content, such as type of account, devices associated with the account, features associated with the account, and the like.

In the event a modification to the centralized web tier 135 content is desired, a business user or other author can access an authoring tier 180 via a workstation or other enterprise terminal device 185. The authoring tier 180 may be a visual tool or other editor that may be used by a business user to create and/or change the uniform web content 125 through an interface or program that is user-friendly. Thus, business users may be able to change the uniform web content 125 with little or no assistance from IT personnel. The authoring tier 180 may include logic for execution on the enterprise terminal device 185 to publish modified rendering logic and/or content to or through the affiliated web sites. The authoring tier 180 may have user interface and repository 190, and allow preview 195 and publication 200 of modified content. Such modified rendering logic and/or content may be published to the centralized web tier 135 and used immediately thereafter, without the need for cooperation from or even notification to the host of the web site 101. Once published, the uniform web content 125 may be immediately incorporated into the web page 115 via the pre-existing standard code references on the client side, e.g., html on the web page 115 that instructs the terminal device 110 to request the rendering logic 145 from the centralized web tier 135. In other words, the modified rendering logic 145 may be transmitted from the centralized server 105 to the terminal device 110 as soon as a modification has been made. Thus, modifications in the centralized web tier 135 may automatically result in modification to the uniform web content 125 on the web page 115 without any need to change anything on the backend side of the web page 115. Thus, the uniform web content 125 may be managed from one location, allowing rapid modification.

The ability to manage the uniform web content 125 centrally may allow for rapid enactment of changes to visual designs, including style, content, colors, logo, menu items, layout of navigation menus, promotional messages, advertisements, and other content, without requiring IT teams to coordinate with any of a number of affiliated web sites. Thus, changes to the uniform web content 125 may automatically be pushed through affiliated web sites, without otherwise affecting them, resulting in minimal maintenance effort for affiliated web sites including the uniform web content 125. Such modifications in a single place may allow a company to forego expensive integration efforts on an ongoing basis with multiple vendors and associated parties and affiliated web sites, reducing the cost of doing business while improving the time it takes for changes to be implemented.

In addition to providing the uniform web content 125 for the web site 101, the rendering logic 145 may also provide the uniform web content 125 for other web sites. For example, the web site 201 may be an affiliated web site of the web site 101, running on a different server. Like the web site 101, the web site 201 may have an authenticating reverse proxy 220, a web page 215, and unique web content 230. Additionally the web site 201 may include code referencing the uniform web content 125 identical to that of the web site 101. The web sites 101, 201, and other similar web sites may be company-hosted web sites, externally-hosted web sites such as ASP web sites, other partner web sites, or otherwise affiliated web sites. Further, any number of affiliated web sites running on any number of servers may cause the generation of the uniform web content 125 in a manner similar to that described herein. Unique web content for various affiliated web sites may include any of a number of different types of content, including, but not limited to, content relating to pictures, messaging, purchasing, account management, access, or other content typically provided by web sites affiliated with a company or organization. Such company or organization may include a telecommunications, banking, finance, retail, or other entity, such that the company hosted web sites relate to a core business of the company. Externally hosted web sites may include application providers, or any other web site using branding used by the company hosted web site.

Portions of the web pages may have content derived from the centralized web tier 135, but not identical to content of other web pages derived from the centralized web tier 135. Thus, the uniform web content 125 may be standardized yet dynamic based on the particular web site displaying the uniform web content 125. While the uniform web content 125 is derived from the centralized web tier 135 and/or the centralized service tier 140, it may not be identical from one web site to another or from one web page to another. For example, the uniform web content 125 may include menu items useful in all affiliated web sites, such as customer support, but may also include menu items that are displayed only on certain web sites, such as applications available for purchase. In some instances, content other than navigation and menus may be included. For example, a weather application, search bar, logo, brand messaging, etc. may be included in the uniform web content 125 of one or more web sites for one or more users. Thus, the uniform web content 125 may provide interactive user navigation from the web pages, e.g., 115, 215, from the web sites, e.g., 101, 201, or other affiliated web sites, to at least some common content or services in a manner that is global with respect to the web sites 101, 201, or other affiliated web sites, resulting in a consistent user experience across multiple web sites.

When the user requests and a web server receives a request for a web page to be provided to a terminal device, code on the client side of the web page causes reference to the centralized web tier 135 and/or the centralized service tier 140, both or either of which may be housed in the centralized server 105. Thus, the terminal device 110 may directly request from the centralized server 105, transmission of the rendering logic 145 to the terminal device 110, allowing rendering of uniform web content. The centralized server 105 may transmit and the terminal device 110 may receive the rendering logic 145 and use the rendering logic 145 to render uniform web content on the web page. The rendering logic may be pulled by the terminal devices of users to generate the uniform content for providing interactive user navigation from pages from the affiliated web sites to at least some common content or services in a manner that is global with respect to the affiliated web sites. In various affiliated web sites, defaults, e.g., standardized menu bar items, such as customer support or other features used for all web sites, may be rendered first, and static menu items, such as menu bar items or applications specific to the web site, may be loaded based on role determined by inspection of cookies. User-specific content, e.g., menu bar items such as account information specific to the user, may be loaded to provide additional customization to the loaded content, based on information from the centralized service tier 140. Thus, the centralized content may maintain a uniform appearance e.g., a menu bar, across numerous company-hosted web sites and externally hosted web sites, while allowing some level of customization. In other words, certain uniform web content 125 such as support/customer service may appear on all web sites, while other the uniform web content 125 such as content relating to web site specific applications may appear only on certain web sites. Further, as indicated above, the appearance of the uniform web content 125 may vary from one user to another, as dictated by the centralized service tier 140. Nonetheless, the uniform web content 125 may maintain a uniform look and feel across various web sites, for various users. Thus, the user may have an integrated experience while moving between multiple web sites, as each web site may load the uniform web content 125 in a same location and having the same or similar contents and layout.

Figure 2:
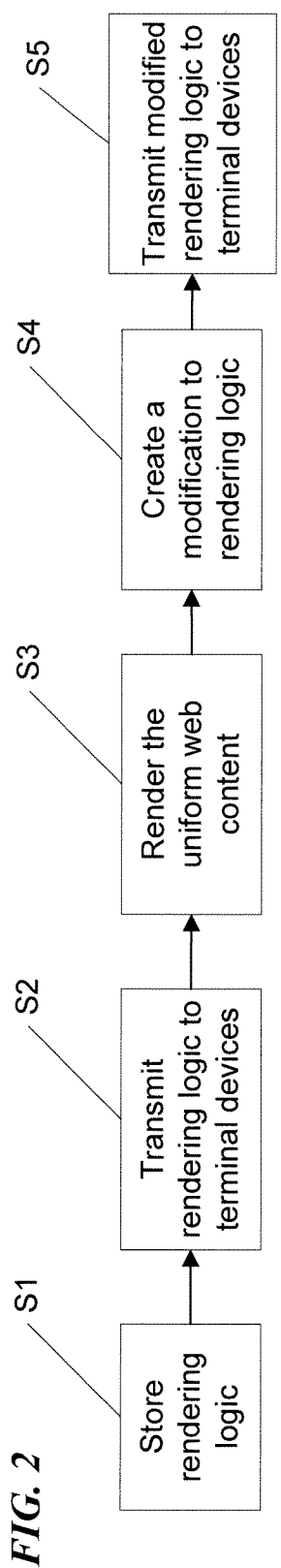
FIG. 2 illustrates a method of providing a framework to present a consistent user experience across multiple web sites, in accordance with certain aspects of the present disclosure.

Referring now to FIG. 2, at step S1, the centralized server 105 stores rendering logic for communication to and execution on terminal devices (user agents or web browsers) of users of affiliated web sites. The affiliated web sites may run on a plurality of servers and may store unique web content for communication to and display, along with the uniform web content, on the terminal device. The rendering logic may include the centralized web tier 135 including rendering logic 145, styling information 150, and branding information 155 for providing uniform web content across the affiliated web sites. At step S2, the centralized server 105 may transmit the rendering logic to the terminal device of a user who is browsing any of the affiliated web sites whose page or pages reference the rendering logic. Such transmission may be responsive to a request from the terminal device to the centralized server 105. The uniform web content may provide interactive user navigation from pages from the affiliated web sites to at least some common content or services in a manner that is global with respect to the affiliated web sites. At step S3, as the rendering logic is run on the terminal devices, the terminal devices may render the uniform web content for providing interactive user navigation from pages from the affiliated web sites to at least some common content or services in a manner that is global with respect to the affiliated web sites. Optionally, at step S4, the authoring tier 180 may create and/or publish a modification to the rendering logic. At step S5, the centralized server 105 may transmit the modified rendering logic directly to the terminal device of a user browsing one of the affiliated web sites.

Figure 3:
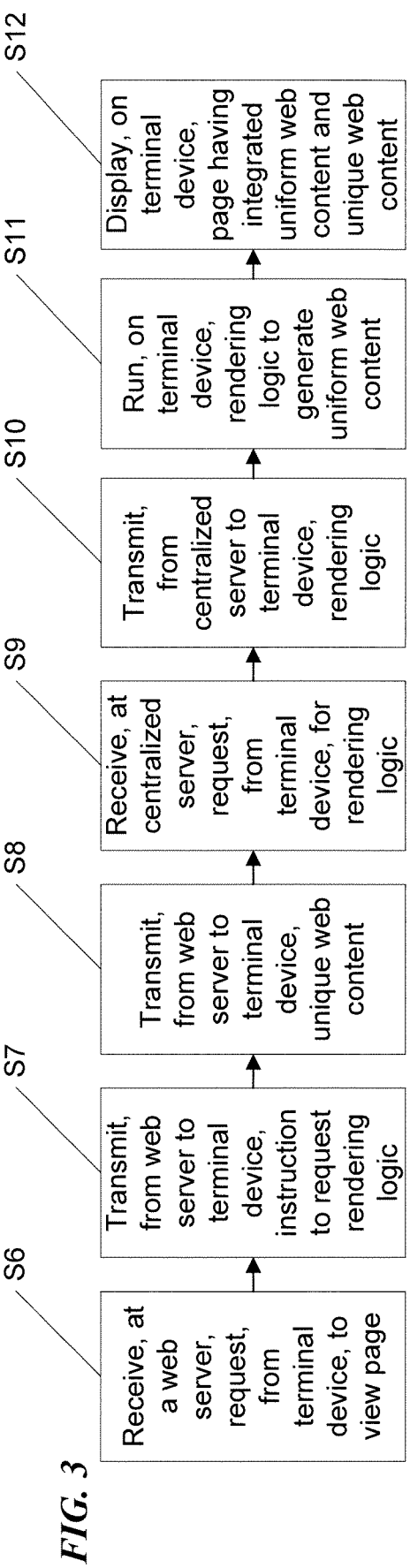
FIG. 3 illustrates a method of providing a framework to present a consistent user experience across multiple web sites, in accordance with certain aspects of the present disclosure.

Referring now to FIG. 3, at step S6, a web server that includes pre-defined references to the rendering logic 145 on centralized server 105 may receive a request from a terminal device of a user to view a page, including unique web content and uniform web content. Responsive to the request from the terminal device to view the page, the web server hosting the affiliated web site may transmit to the terminal device at step S7 instruction for the terminal device to communicate with the centralized server 105 to request from the server 105 the rendering logic for the uniform web content, and at step S8 unique web content for display with the uniform web content. At step S9, based on the pre-defined references to the rendering logic present within the web page, and responsive to the instruction to refer to the rendering logic for the uniform web content, the terminal device may directly request the rendering logic for providing the uniform web content, and the centralized server 105 may receive the request for the rendering logic from the terminal device. Thus, the request may be direct from the terminal device and may not be provided through a server hosting any of the affiliated web sites. The rendering logic may reference styling information, navigational elements, and branding information for providing uniform web content across a plurality of affiliated web sites. At step S10, the server 105 may transmit the rendering logic to the terminal device and the terminal device may receive the rendering logic from the centralized server 105. At step S11, the terminal device may run the rendering logic to generate the uniform web content. At step S12, the terminal device may display a page having the integrated uniform web content and unique web content. Thus, the terminal device may simultaneously display the unique web content and the uniform web content. The uniform web content may provide interactive user navigation from the page to at least some common content or services in a manner that is global with respect to the affiliated web sites.

Figure 5:
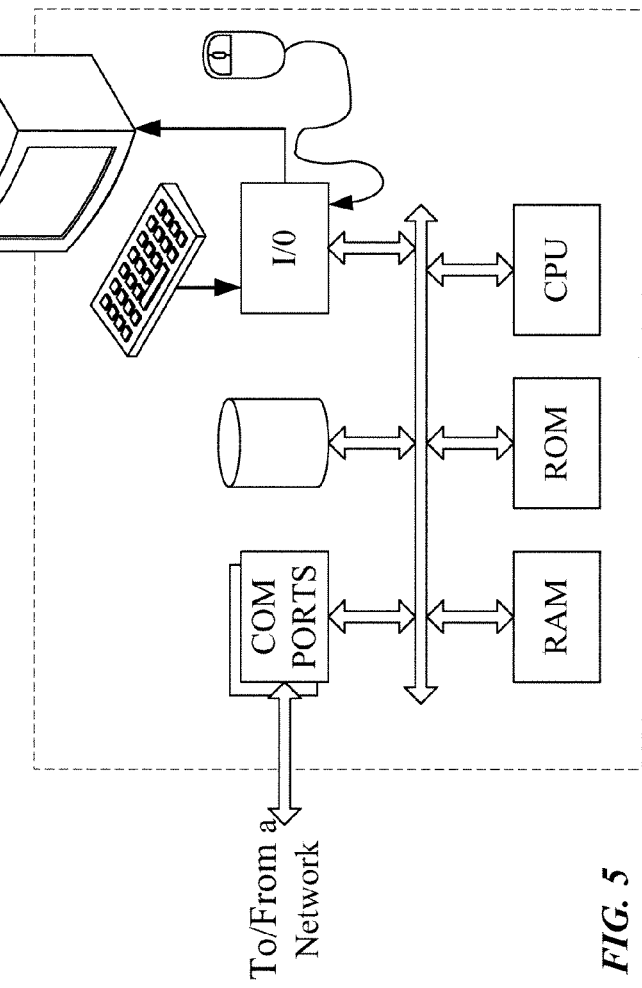
FIG. 5 is a simplified functional block diagram of a personal computer or other workstation or terminal device.
Figure 4:
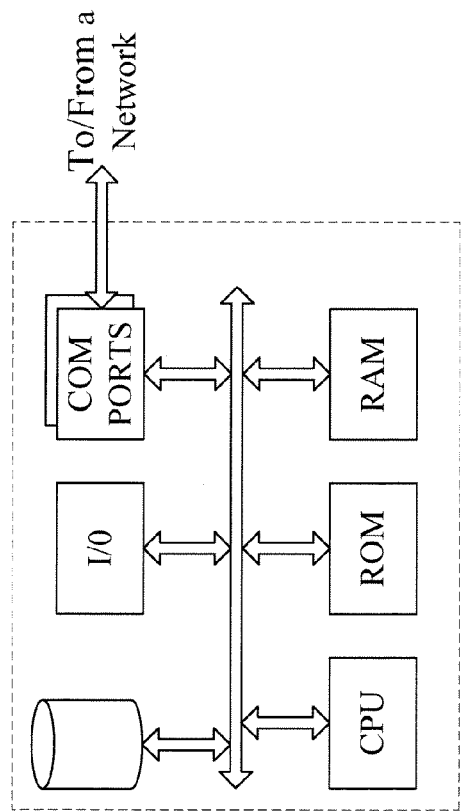
FIG. 4 is a simplified functional block diagram of a computer that may be configured as a host or server.

FIGS. 4 and 5 provide functional block diagram illustrations of general purpose computer hardware platforms. FIG. 4 illustrates a network or host computer platform, as may be used to implement a server. FIG. 5 depicts a computer with user interface elements, as may be used to implement a personal computer or other type of workstation or terminal device, although the computer of FIG. 5 may also act as a server if appropriately programmed. It is believed that those skilled in the art are familiar with the structure, programming, and general operation of such computer equipment and as a result, the drawings should be self-explanatory.

As known in the data processing and communications arts, a general-purpose computer may include a central processor or other processing device, an internal communication bus, various types of memory or storage media (RAM, ROM, EEPROM, cache memory, disk drives, etc.) for code and data storage, and one or more network interface cards or ports for communication purposes. The software functionalities involve programming, including executable code as well as associated stored data and content relating to affiliated web sites. The software code is executable by the general-purpose computer that functions as the server and/or that functions as a client device. In operation, the code is stored within the general-purpose computer platform. At other times, however, the software may be stored at other locations and/or transported for loading into the appropriate general-purpose computer system. Execution of such code by a processor or central proceeding unit of the computer platform enables the platform to implement the techniques described herein, in essentially the manner performed in the implementations discussed and illustrated herein.

A server, for example, includes a data communication interface for packet data communication. The server also includes a central processing unit (CPU), in the form of one or more processors, for executing program instructions. The server platform may include an internal communication bus, program storage, and data storage for various data files to be processed and/or communicated by the server, although the server often receives programming and data via network communications. The hardware elements, operating systems, and programming languages of such servers and client devices are conventional in nature, and it is presumed that those skilled in the art are adequately familiar therewith. Of course, the server functions may be implemented in a distributed fashion on a number of similar platforms, to distribute the processing load.

Hence, aspects of the present methods outlined above may be embodied in programming. Program aspects of the technology may be thought of as "products" or "articles of manufacture" and may be in the form of executable code and/or associated data that is carried on or embodied in a type of machine-readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible, non-transitory "storage" media, terms such as computer or machine "readable medium" refer to any medium that participates in providing instructions to a processor for execution.

Hence, a machine-readable medium may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the social network method, etc., shown in the drawings. Volatile storage media include dynamic memory, such as main memory of such a computer platform. Tangible transmission media include coaxial cables, copper wire, and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The methods and systems of the present disclosure may provide a number of advantages, which may include, but are not limited to the following:

Centralization—the look, feel, and content of the uniform web content 125 can be vended or displayed from a central location, which may make the uniform web content 125 and thus, the brand of the company, easier to maintain. Additionally, this may remove the need for each affiliated web site and/or application to have local copies enhances operations;

Personalization—the uniform web content 125 may include user-based content provided when the user logs in or is otherwise authenticated, and such authentication may follow the user to affiliated web sites, providing the user with a consistent experience when visiting various affiliated web sites. Additionally using a combination of techniques and frameworks such as AJAX, CDSSO, and client-side JavaScript sourcing allows the uniform web content 125 to be dynamic, secure, personalized, and customizable;

Consistency—the uniform web content 125 may be displayed on various web pages of any of a number of affiliated web sites, providing the same look, feel, and overall branding across all web sites associated with the company;

Cross-Domain—the client-side approach allows for usage of the uniform web content 125 across multiple affiliated web sites, in a secure fashion;

Dynamic—the uniform web content 125 may be updated rapidly and frequently, without the need to coordinate with the various affiliated web sites;

Easily Inserted—the client-side approach allows for the uniform web content 125 to easily plug into various affiliated web sites;

Maintainability—from a rendering perspective, maintenance is improved as changes can be made at a central location without requiring each affiliated web site to make changes;

Fast-Rendering—the optimized loading of the uniform web content 125 before loading of unique web content 130 allows the user to see and interact with web pages more quickly, enhancing the user's experience; and Client-Side Framework—the uniform web content 125 may be accessed by the client-side, allowing for more rapid loading, while still allowing for integration, no matter what the web site platform may be. A different Application Programming Interface (API) may be used for each affiliated web site and/or for each user. Simple client-side integration with each affiliate web site does not require server-side inclusion.

In some aspects, the teachings of the present disclosure may apply to server-side techniques for initial load. Similarly, while various affiliated web sites have been discussed, similar methods and systems may be used for internal domains or other collections of intranet web sites with a need for a common look, feel, and/or navigation for marketing or other purposes.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

APPENDIX

Acronym List

The description above has used a large number of acronyms to refer to various services, messages, and system components. Although generally known, use of several of these acronyms is not strictly standardized in the art. For the convenience of the reader, the following list correlates terms to acronyms, as used by way of example in the detailed description above.

AJAX—Asynchronous JavaScript and Extensible Markup Language
API—Application Programming Interface
ASP—Application Service Provider CD-ROM—Compact Disc Read Only Memory
CDSSO—Cross-Domain Single Sign On
CPU—Central Processing Unit
CSS—Cascading Style Sheet
DOM—Document Object Model
DVD—Digital Video Disc
DVD-ROM—Digital Video Disc Read Only Memory
EPROM—Erasable Programmable Read Only Memory
FLASH-EPROM—Flash Erasable Programmable Read Only Memory
IR—Infrared
IT—Information Technology
Java EE—Java Platform, Enterprise Edition
JSON—JavaScript Object Notation
PHP—Hypertext Preprocessor
PROM—Programmable Read Only Memory
RAM—Random Access Memory
REST—Representational State Transfer
RF—Radio Frequency
ROM—Read Only Memory
SSO—Single Sign On

What is claimed is:

1. A system comprising:
at least one computer platform configured as: a web server and a centralized server; and
client-side rendering logic for communication from the centralized server to and execution on a terminal device of a user of any of a plurality of affiliated web sites running on the at least one computer platform configured as a web server to provide uniform web content across the affiliated web sites on the terminal device, wherein:
the client-side rendering logic configures the terminal device to render uniform web content received on the terminal device for display to a user when the client-side rendering logic is executed on the terminal device; and
the uniform web content provides interactive user navigation from pages from the affiliated web sites to at least some common content or services in a manner that is global with respect to the affiliated web sites.

2. The system of claim 1 wherein the communication of the rendering logic is in response to a request from the terminal device to the centralized server in which the client-side logic is stored.

3. The system of claim 2 wherein:
the request is in response to an instruction by one of the affiliated web sites for the terminal device to communicate with the centralized server to request from the centralized server the rendering logic for the uniform web content, and
the instruction is in response to an earlier request from the terminal device to the one of the affiliated web sites to view a web page of the one of the affiliated web sites.

4. The system of claim 3 further comprising unique web content of the one of the affiliated web sites for communication to and display on the terminal device such that the terminal device is able to simultaneously display the unique web content and the uniform web content, wherein the communication of the unique web content is in response to the earlier request.

5. The system of claim 1 further comprising unique web content for communication to and display on the terminal device with the uniform web content, wherein the communication of the unique web content is responsive to a request from the terminal device to view a web page.

6. The system of claim 1 wherein:
the uniform web content comprises user-specific content; and
the system further comprises a centralized service tier including an authenticating reverse proxy, web services, and a user profile repository for providing the user-specific content.

7. The system of claim 1 further comprising an authoring tier for modifying the rendering logic.

8. The system of claim 7 wherein the authoring tier includes logic for execution on an enterprise terminal device to publish modified rendering logic.

9. The system of claim 1 wherein
each of the affiliated web sites are configured to communicate unique web content to the terminal device, for display with the uniform web content.

10. The system of claim 1 wherein:
the rendering logic is stored on the centralized server.

11. The system of claim 1 further comprising a centralized web tier including the rendering logic, styling information, and branding information for providing the uniform web content across the affiliated web sites.

12. A method comprising steps of:
storing, on a centralized server, rendering logic for communication to and execution on terminal devices of users of affiliated web sites running on a plurality of servers; and
responsive to a request from a particular one of the terminal devices, transmitting, from the centralized server to the particular terminal device, the rendering logic,
wherein the rendering logic, when run on the terminal devices, is configured to render uniform web content for display providing interactive user navigation among the affiliated web sites to at least some common content or services in a manner that is global with respect to the affiliated web sites.

13. The method of claim 12 wherein the request is a direct request that is not provided through a server hosting any of the affiliated web sites.

14. The method of claim 12 further comprising:
receiving an earlier request from the particular terminal device at a server hosting one of the affiliated web sites to view a web page of the one of the affiliated web sites; and
transmitting, in response to the earlier request, an instruction from the one of the affiliated web sites to the particular terminal device, the instruction instructing the particular terminal device to communicate with the centralized server to request from the centralized server the rendering logic for the uniform web content.

15. The method of claim 14 further comprising transmitting, in response to the earlier request, from the one of the affiliated web sites to the particular terminal device unique web content of the one of the affiliated web sites such that the particular terminal device is able to simultaneously display the unique web content and the uniform web content.

16. The method of claim 12 wherein the rendering logic, when run on the terminal device, is configured to render the uniform web content for display with unique web content provided by a particular affiliated web site.

17. The method of claim 12 wherein:
the uniform web content comprises user-specific content; and
the user-specific content is enabled by a centralized service tier including an authenticating reverse proxy, web services, and a user profile repository for providing the user-specific content.

18. The method of claim 12 further comprising:
creating, via an authoring tier, a modification to the rendering logic; and
transmitting from the centralized server to the terminal devices, the modified rendering logic.

19. The method of claim 12 wherein a centralized web tier comprises the rendering logic, styling information, and branding information.

20. A method comprising steps of:
receiving, at a server hosting a web site, a request from a terminal device to view a web page having unique web content that is unique among a plurality of affiliated web sites and uniform web content that is uniform among the affiliated web sites;
transmitting, in response to receiving the request, from the server to the terminal device, the unique web content in addition to an instruction to request from a centralized server rendering logic for providing the uniform web content;
receiving, at the centralized server, another request from the terminal device for the rendering logic; and
transmitting, in response to receiving the other request, the rendering logic from the centralized server to the terminal device;
wherein the rendering logic, when run on the terminal device, is configured to render the uniform web content for display with the unique web content as the requested web page, and
wherein the uniform web content provides interactive user navigation from the displayed web page to at least some common content or services in a manner that is global with respect to the affiliated web sites.

21. The method of claim 20 wherein:
the uniform web content comprises user-specific content; and
the user-specific content is enabled by a centralized service tier including an authenticating reverse proxy, web services, and a user profile repository for providing the user-specific content.

22. The method of claim 20 wherein a centralized web tier comprises the rendering logic, styling information, and branding information for providing the uniform web content across the affiliated web sites.

* * * * *